(12) United States Patent
Voice et al.

(10) Patent No.: US 11,754,023 B2
(45) Date of Patent: Sep. 12, 2023

(54) PROCESS FOR IMPROVING ENGINE EFFICIENCY USING A FUEL REFORMING SYSTEM

(71) Applicant: ARAMCO SERVICES COMPANY, Houston, TX (US)

(72) Inventors: Alexander K. Voice, Detroit, MI (US); Andrew Baur, Whitmore Lake, MI (US); Xin Yu, New Hudson, MI (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/462,904

(22) Filed: Aug. 31, 2021

(65) Prior Publication Data
US 2023/0074674 A1 Mar. 9, 2023

(51) Int. Cl.
*F02M 26/36* (2016.01)
*F02M 26/05* (2016.01)
(Continued)

(52) U.S. Cl.
CPC ............ *F02M 26/36* (2016.02); *F01N 13/10* (2013.01); *F01N 2240/30* (2013.01);
(Continued)

(58) Field of Classification Search
CPC .. F01N 13/10; F01N 2240/30; F01N 2340/06; F01N 2610/03; F01N 2610/08;
(Continued)

(56) References Cited

U.S. PATENT DOCUMENTS 10,233,809 B2  3/2019  Henry
2005/0053534 A1  3/2005  Liu et al.
(Continued)

FOREIGN PATENT DOCUMENTS

DE  20 2014 102098 U1  7/2014
EP  2 569 524 A1  3/2013
(Continued)

OTHER PUBLICATIONS

Kopasz, John P., et al., "Challenges in Reforming Gasoline: All Components are Not Created Equal", SAE International, SAE Technical Paper Series 2001-01-1915, May 7-9, 2001 (9 pages).
(Continued)

*Primary Examiner* — Jorge L Leon, Jr.
(74) *Attorney, Agent, or Firm* — Osha Bergman Watanabe & Burton LLP

(57) ABSTRACT

A method of operating an engine includes igniting a combustible mixture in a combustion chamber of the engine, which produces exhaust gases. The exhaust gases are ejected into an exhaust manifold of the engine to create a primary exhaust stream. A portion of the exhaust gases is separated from the primary exhaust stream to create a secondary exhaust stream. Air and fuel are then mixed with the secondary exhaust stream to form a reformer feed mixture. The reformer feed mixture is reacted in a catalytic reformer to create a reformate exhaust stream, which is then mixed with an intake air stream to create a mixed air stream. The mixed air stream is the fed to the combustion chamber of the engine as the combustible mixture.

13 Claims, 5 Drawing Sheets

(51) Int. Cl.
  *F02M 26/06* (2016.01)
  *F02M 26/07* (2016.01)
  *F02M 26/10* (2016.01)
  *F02M 26/21* (2016.01)
  *F02M 26/22* (2016.01)
  *F01N 13/10* (2010.01)

(52) U.S. Cl.
  CPC ...... *F01N 2340/06* (2013.01); *F01N 2610/03* (2013.01); *F01N 2610/08* (2013.01); *F01N 2610/146* (2013.01); *F01N 2900/08* (2013.01); *F01N 2900/1411* (2013.01); *F02M 26/05* (2016.02); *F02M 26/06* (2016.02); *F02M 26/07* (2016.02); *F02M 26/10* (2016.02); *F02M 26/21* (2016.02); *F02M 26/22* (2016.02)

(58) Field of Classification Search
  CPC ........... F01N 2610/146; F01N 2900/08; F01N 2900/1411; F02M 26/05; F02M 26/06; F02M 26/07; F02M 26/10; F02M 26/21; F02M 26/22; F02M 26/36
  USPC ......... 60/278, 279, 280, 299, 303, 320, 323, 60/324
  See application file for complete search history.

(56) References Cited

U.S. PATENT DOCUMENTS

| | | | |
|---|---|---|---|
| 2005/0103543 A1 | 5/2005 | Liu et al. | |
| 2006/0048502 A1 | 3/2006 | Washington et al. | |
| 2008/0295501 A1* | 12/2008 | Gong | F02M 25/12 60/299 |
| 2012/0048216 A1* | 3/2012 | Tomazic | F02M 26/15 123/3 |
| 2012/0312087 A1* | 12/2012 | Inuzuka | F02M 26/36 73/114.45 |
| 2013/0333639 A1* | 12/2013 | Hoshino | F02M 27/02 123/3 |
| 2014/0331970 A1* | 11/2014 | Bidner | F02D 19/10 123/435 |
| 2015/0166913 A1* | 6/2015 | Brody | F02M 27/02 48/127.7 |
| 2016/0076488 A1* | 3/2016 | Henry | F02M 26/43 60/274 |
| 2017/0361296 A1* | 12/2017 | Aoyagi | F02D 19/0671 |
| 2018/0010555 A1* | 1/2018 | Lee | F02M 26/09 |
| 2019/0323458 A1* | 10/2019 | Voice | F02M 26/35 |
| 2020/0018267 A1* | 1/2020 | Baek | F02B 43/10 |
| 2020/0018268 A1* | 1/2020 | Merchant | F02M 27/02 |

FOREIGN PATENT DOCUMENTS

| | | | |
|---|---|---|---|
| FR | 2 928 700 A1 | 9/2009 | |
| FR | 2928699 A1 * | 9/2009 | ......... F02D 19/0644 |
| WO | WO-2019157581 A1 * | 8/2019 | ............... F02G 5/02 |

OTHER PUBLICATIONS

Brookshear, D. William, et al., "Catalytic Steam and Partial Oxidation Reforming of Liquid Fuels for Application in Improving the Efficiency of Internal Combusion Engines", ACS Publications, vol. 32, pp. 2267-2281, 2018 (15 pages).

Stone, Richard, et al., "Analysis of Combustion and Particulate Emissions when Hydrogen is Aspirated into a Gasoline Direct Injection Engine", SAE International, Paper 2010-01-0580, Apr. 12, 2010 (13 pages).

Gerty, Michael D., et al., "An Investigation of Gasoline Engine Knock Limited Performance and the Effects of Hydrogen Enhancement", SAE International, SAE Technical Paper Series 2006-01-0228, pp. 1-21, Apr. 3-6, 2006 (23 pages).

Gukelberger, Raphael, et al., "Alternative Fuel Testing on a Port Fuel Injected LPL EGR and D-EGR® Engine", SAE International, Paper 2016-01-2170, Oct. 17, 2016 (14 pages).

Kirwan, John E., et al., "Advanced Engine Management Using On-Board Gasoline Partial Oxidation Reforming for Meeting Super-ULEV (SULEV) Emissions Standards", SAE International, SAE Technical Paper Series 1999-01-2927, pp. 1-14, Aug. 17-19, 1999 (16 pages).

Chadwell, C., et al., "A Demonstration of Dedicated EGR on a 2.0 L GDI Engine", SAE International, Paper 2014-01-1190, pp. 434-437, Apr. 1, 2014 (4 pages).

Szybist, James P., et al., "The Reduced Effectiveness of EGR to Mitigate Knock at High Loads in Boosted SI Engines", SAE International, pp. 2305-2309, Sep. 4, 2017 (4 pages).

Alger, Terrence, et al., "The Interaction between Fuel Anti-Knock Index and Reformation Ratio in an Engine Equipped with Dedicated EGR", SAE International, Paper 2016-01-0172, pp. 786-795, Apr. 5, 2016 (10 pages).

Newkirk, Marc S., et al., "The Boston Reformed Fuel Car", SAE International, Technical Paper 720670, Feb. 1, 1972 (4 pages).

Ashida, Koichi, et al., "Study of an On-board Fuel Reformer and Hydrogen-Added EGR Combustion in a Gasoline Engine", SAE International, Paper 2015-01-0902, pp. 358-366, Apr. 14, 2015 (9 pages).

Gukelberger, Raphael, et al., "LPL EGR and D-EGR® Engine Concept Comparison Part 2: High Load Operation", SAE International, Paper 2015-01-0781, pp. 547-556, Apr. 14, 2015 (10 pages).

Gukelberger, Raphael, et al., "LPL EGR and D-EGR® Engine Concept Comparison Part 1: Part Load Operation", SAE International, Paper 2015-01-0783, pp. 570-582, Apr. 14, 2015 (13 pages).

Tully, Edward J., et al., "Lean-Burn Characteristics of a Gasoline Engine Enriched with Hydrogen from a Plasmatron Fuel Reformer", SAE Technical Paper Series 2003-01-0630, Mar. 3-6, 2003 (16 pages).

Alger, Terrence, et al., "Impact of EGR Quality on the Total Inert Dilution Ratio", SAE International, Paper 2016-01-0173, pp. 796-806, Apr. 5, 2016 (11 pages).

Han, Taehoon, et al., "Effect of Syngas (H2/CO) on SI Engine Knock under Boosted EGR and Lean Conditions", SAE International, pp. 960-969, Mar. 28, 2017 (11 pages).

International Search Report and Written Opinion of the International Searching Authority dated Dec. 1, 2022 in corresponding International (PCT) Application No. PCT/US2022/042231.

* cited by examiner

PROCESS FOR IMPROVING ENGINE EFFICIENCY USING A FUEL REFORMING SYSTEM

BACKGROUND

Operating a combustion engine consists of igniting a combustible mixture of fuel and air in a combustion chamber of the combustion engine. When the combustible mixture is ignited, exhaust gases are produced and ejected from the combustion chamber into an exhaust manifold and catalytic reformer, where the exhaust gases are reformed into water and carbon dioxide. The exhaust gases are then released into the atmosphere, and the engine operation may restart.

A portion of the exhaust gases may be recirculated into the combustion chamber or an air cooler of the engine in a process known as exhaust gas recirculation, or EGR. Recirculating the exhaust gases aids in the combustion process by diluting the combustible mixture with the inert exhaust gases, which reduces the maximum temperature generated by the combustion reaction. The reduced temperature of the diluted combustible mixture allows for the engine to operate at a higher compression ratio and torque output, without damage, by preventing the premature ignition of the mixture, or "knock". Additionally, reducing the heat generated by the combustion reaction reduces pumping work at low load, and reduces the production of exhaust gases that may be harmful to the atmosphere in high concentrations, such as nitrogen oxide ($NO_x$).

SUMMARY

A method of operating an engine includes igniting a combustible mixture in a combustion chamber of the engine, which produces exhaust gases. The exhaust gases are ejected into an exhaust manifold of the engine to create a primary exhaust stream. A portion of the exhaust gases is separated from the primary exhaust stream to create a secondary exhaust stream. Air and fuel are then mixed with the secondary exhaust stream to form a reformer feed mixture. The reformer feed mixture is reacted in a catalytic reformer to create a reformate exhaust stream, which is then mixed with an intake air stream to create a mixed air stream. The mixed air stream is the fed to the combustion chamber of the engine as the combustible mixture.

A system includes an engine containing a combustion chamber that ignites a combustible mixture that produces exhaust gases. The engine also includes an air intake manifold that feeds a first portion of air into the combustion chamber, a first fuel injector that injects a first portion of fuel into either the combustion chamber or engine intake air stream, and an exhaust manifold that receives combustion products from the combustion chamber to form a primary exhaust stream. The engine further includes a first exhaust line that connects the exhaust manifold to a tailpipe and a second exhaust line, branching from the first exhaust line that provides a portion of the combustion products to a catalytic reformer. The system further includes an air injector that injects a second portion of air into the second exhaust line, a second fuel injector that injects a second portion of fuel into the second exhaust line, and a reformer effluent line that connects the catalytic reformer to the air intake manifold.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the disclosure may include a system and method for increasing the amount of hydrogen gas ($H_2$) and carbon monoxide (CO) available in a mixed air stream that is fed into the combustion chamber of the engine. Because $H_2$ and CO have a higher flame speed and knock tolerance during combustion, the increased concentrations of $H_2$ and CO in the combustion chamber allows for more dilute combustible mixtures and higher engine compression ratios. Furthermore, the knock and dilution tolerance benefits of displacing part of the liquid gasoline fuel with $H_2$ or CO generally scales with the amount of $H_2$ or CO added. However, due to the lack of $H_2$ and CO onboard the vehicle, it may be beneficial to produce these molecules in the system itself by using an onboard fuel reforming process.

Accordingly, the system and methods disclosed herein may be used to increase the amount of $H_2$ and CO that can be fed into the combustion chamber of the engine to improve the engine performance.

Figure 1:
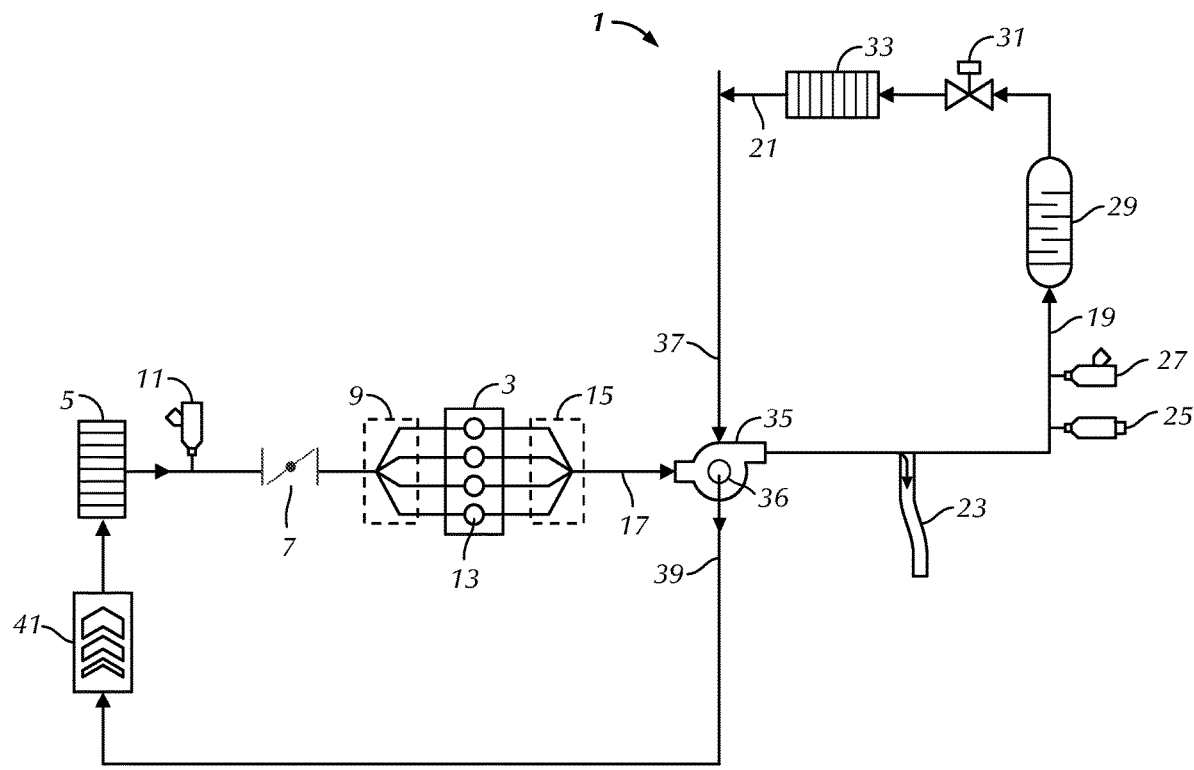
FIG. 1 illustrates a flow diagram in accordance with one or more embodiments.

FIG. 1 shows a simplified flow diagram of a system including a fuel reforming system 1 and engine 3 in accordance with one or more embodiments disclosed herein.

As seen in FIG. 1, the fuel reforming process begins with an engine 3 which may have an air-cooling device 5, a throttle 7, and an air intake manifold 9 that are configured to facilitate the intake of a first portion of air into a combustion chamber 13. Specifically, when a piston (not shown) of the engine 3 actuates, the resulting vacuum created by the piston (not shown) draws the first portion of air through the air intake manifold 9 into the combustion chamber 13. One or more of these components may be formed from aluminum, cast iron, steel, stainless steel, or a composite plastic material. However, in the embodiment depicted in FIG. 1, the air-cooling device 5, throttle 7, and air intake manifold 9 are formed from aluminum.

Initially, the first portion of air may be drawn through the air-cooling device 5. The air-cooling device 5 may be embodied as a charge air cooler or an intercooler and serves to reduce the temperature of the first portion of air entering the combustion chamber 13, which may further diminish knock in the combustion chamber 13. Once the first portion of air has been passed through the air-cooling device 5, the first portion of air may be drawn through the throttle 7.

The throttle 7 may be embodied as a singular throttle body or a plurality of throttle bodies and serves to control the amount of air introduced into the combustion chamber 13. In various embodiments, the throttle 7 may include a butterfly valve controlled by an engine control unit (not shown), or ECU, of the engine 3 that selectively allows the first portion of air to pass through the throttle 7 and into the air intake manifold 9. The air intake manifold 9 may be embodied as a series of interconnected pipes that are configured to evenly distribute the first portion of air from the throttle 7 to one or more combustion chamber(s) 13.

The engine 3 may also have a first fuel injector 11 configured to inject fuel that may be mixed with the first portion of air to form the combustible mixture. The first fuel injector 11 may be disposed upstream of the throttle 7 such that the fuel is injected into the first portion of air prior to entering the throttle 7, or the first fuel injector 11 may be disposed downstream of throttle 7 or may inject fuel in the combustion chamber 13 such that the combustible mixture is formed in the combustion chamber 13. Alternatively, the first fuel injector 11 and throttle 7 may be embodied as a throttle body injection system, in which case the throttle body houses both the first fuel injector 11 and the throttle 7.

Once the combustible mixture is in the combustion chamber 13, the combustible mixture is compressed by a piston (not shown) of the engine 3 and subsequently ignited by a spark-ignition device such as a spark plug (not shown). Alternatively, if the engine 3 is a compression ignition engine, the combustible mixture may be ignited by compressing the combustible mixture to the point in which it automatically ignites without a spark-ignition device. In either case, the resultant combustion of the combustible mixture creates exhaust gases, which expand due to the heat of the combustion reaction. The expansion of the exhaust gases in the combustion chamber 13 causes the piston (not shown) of the engine 3 to actuate, thereby producing work that is distributed to an output shaft (not shown) of the engine 3.

Once the combustion reaction is complete, the exhaust gases are ejected by the piston (not shown) into an exhaust manifold 15 of the engine 3. The exhaust manifold 15 is configured to connect the combustion chamber 13 to a first exhaust line 17 and receives the combustion products from the combustion chamber 13 to create a primary exhaust stream. This primary exhaust stream is fed into the first exhaust line 17, which connects the engine 3 to a tailpipe 23, where the primary exhaust stream exits to the atmosphere.

In the embodiment depicted in FIG. 1, a turbocharger 35 is coupled to the first exhaust line 17 such that the primary exhaust stream actuates a turbine 36 of the turbocharger 35. The turbocharger 35 may include a turbocharger inlet line 37 configured to deliver a first portion of air into the turbocharger 35, and a turbocharger outlet line 39 configured to connect the turbocharger 35 to the air intake manifold 9. As the primary exhaust stream actuates the turbine 36 of the turbocharger 35, the temperature and pressure of the primary exhaust stream is lowered due to the energy used to actuate the turbine 36. The turbocharger 35 may further include a waste gate that allows a portion of the primary exhaust stream to bypass the turbocharger 35 depending upon the operating conditions of the engine 3. In addition, the movement of the turbine 36 allows the turbocharger 35 to draw air into a turbocharger inlet line 37, and the turbocharger 35 compresses the air drawn through the turbocharger inlet line 37 to create a compressed air stream. The compressed air stream may then be fed into the air intake manifold 9 of the engine 3 to be utilized during the combustion of the combustible mixture.

In order to recirculate and reform the exhaust gases from the engine 3, a fuel reforming system 1 may be connected to the engine 3. The fuel reforming system 1 may include an air injector 25, a second fuel injector 27, a second exhaust line 19, a catalytic reformer 29, a reformate valve 31, a reformate cooling device 33, and a reformer effluent line 21. In order for the fuel reforming system 1 to capture exhaust gases from the first exhaust line 17, the second exhaust line 19 branches from the first exhaust line 17 and connects to catalytic reformer 29. Due to the pressure of the primary exhaust stream from the combustion reaction, the combustion products may enter into the second exhaust line 19 and begin the reformation process.

In the embodiment shown in FIG. 1, the second exhaust line 19 branches away from the first exhaust line 17 downstream of the turbocharger 35. However, regardless of the configuration of the second exhaust line 19 in relation to the first exhaust line 17, a portion of the primary exhaust stream is separated from the primary exhaust stream at the juncture of the first exhaust line 17 and the second exhaust line 19 to create a secondary exhaust stream. In the embodiment depicted in FIG. 1, the secondary exhaust stream has a lower pressure and temperature, called low-pressure EGR, than the exhaust gases in the primary exhaust stream upstream of the turbocharger 35. Because the secondary exhaust stream is formed from low-pressure EGR, the turbocharger 35 can generate more boost than if the secondary exhaust stream was created upstream of the turbocharger 35 and formed from high-pressure EGR.

An air injector 25 and a second fuel injector 27 may be fluidly coupled to second exhaust line 19. The air injector 25 and the second fuel injector 27 may also be controlled by an ECU (not shown) of the engine 3 and configured to inject air and fuel into the secondary exhaust stream. The second fuel injector 27 may be coupled to the second exhaust line 19 upstream or downstream of the air injector 25. However, in the embodiment depicted in FIG. 1, the second fuel injector 27 is coupled downstream of the air injector 25. This arrangement provides the added benefit of allowing the air injected from the air injector 25 to be further mixed with the secondary exhaust stream due to the increased turbulence from the second fuel injector 27.

The second fuel injector 27 may be embodied as a fuel rail containing a plurality of fuel injectors, or a singular fuel nozzle configured to spray fuel into the secondary exhaust stream. In addition, the air injector 25 may be embodied as a venturi mixer, sparger, or nozzle that is configured to homogeneously mix air with the secondary exhaust stream and control the flow of air into the secondary exhaust streams. In each of these embodiments of the air injector 25, the air injector 25 meters the flow of air through the air injector 25 and uses the pressure drop through the air injector 25 to distribute the air in the exhaust. In order to control the amount of air injected into the second exhaust line 19, the fuel reforming system 1 may further include a valve or pump (not shown) controlled by the ECU (not shown) and disposed upstream of the air injector 25. Alternatively, the second fuel injector 27 and air injector 25 may be embodied as a carburetor or throttle body, in which case the carburetor or throttle body will be attached to the second exhaust line 19. Regardless of the configuration, the air injector 25 and the second fuel injector 27 may be configured to sequentially or simultaneously inject air and fuel into the secondary exhaust stream. By injecting fuel and air into the secondary exhaust stream, a reformer feed mixture is formed that may be fed to and reacted in the catalytic reformer 29.

The mass of fuel and air injected by the air injector 25 and second fuel injector 27 may depend on the brake mean effective pressure, or BMEP, of the engine 3, which may be calculated by the ECU (not shown). BMEP represents the average pressure in the combustion chamber 13 that would produce a measured power output. In addition, BMEP is calculated as a function of the number of revolutions per engine stroke, the torque produced by the engine 3, and the total volume of the plurality of combustion chambers 13. For example, BMEP may be calculated by the following formula:

$$BMEP = 2\pi n_c \frac{T}{V_d}$$

where BMEP is the brake mean effective pressure, $n_c$ is the number of revolutions per power stroke, T is the torque output of the engine 3, and $V_d$ is the volumetric displacement of the engine 3.

Table 1, below, shows an example of the injection rates of fuel and air injected into the secondary exhaust stream as a function of the BMEP of the engine 3 for the embodiment depicted in FIG. 1. The values depicted in Table 1 are not intended to limit the scope of the invention in any regard. Rather, these values are provided in order to further enhance the description of one embodiment of the claimed invention.

TABLE 1

EGR, Fuel Injection, and Air Injection Rates

| BMEP | EGR rate | Fuel Injection rate | Air Injection Rate |
|------|----------|---------------------|--------------------|
| 5 bar | 0% | 0% | 0% |
| 7 bar | 20% | 0% | 0% |
| 9 bar | 25-30% | 40-60% | 1-5% |

The EGR rate is given as a mass percent of the exhaust gases in the combustible mixture, while the fuel injection rate and air injection rate are expressed as a fraction of the fuel that was injected into the engine 3 to produce the exhaust gases going to the reformer (i.e., normalized by the EGR rate). For example, an EGR rate of 25% implies that the mass of the exhaust gases that are fed into the combustion chamber 13 is 25% of the total mass of the combustible mixture, including the exhaust gases. In addition, a fuel injection rate or air injection rate of 100% coupled with an EGR rate of 25% implies that the mass of fuel or air injected into the secondary exhaust stream is 25% of the mass of air or fuel fed to the engine 3. These values are summarized by the below equations for the EGR rate and injection rate, respectively.

$$EGR\ Rate = \frac{Mass\ of\ EGR\ in\ Combustion\ Chamber}{Mass\ of\ Total\ Combustible\ Mixture}$$

$$Injection\ Rate = \frac{Mass\ of\ Fuel\ or\ Air\ Injected\ in\ Exhaust\ Stream}{Mass\ of\ Fuel\ or\ Air\ Fed\ to\ Engine * EGR\ Rate}$$

As seen in Table 1, the air injection rate ranges between 0-5% for an EGR rate of 0-30% and a BMEP of 5-9 bar, while the fuel injection rate ranges between 0-60% for an EGR rate of 0-30% and a BMEP of 5-9 bar. Air injection raises the temperature within the reformer and boosts the reformate yield but also results in parasitic losses. Thus, the air injection rate, which controls the amount of partial oxidation reactions occurring in the reformer, may be minimized in one or more embodiments of the invention such that combustion stabilizes at the desired EGR rate.

However, the amount of air, fuel, and EGR that are recirculated to the engine 3 may be optimized to a number of performance metrics. Specifically, the mass of the fuel and the mass of the air injected into the secondary exhaust stream may be determined according to the measured brake mean effective pressure, the desired EGR rate to avoid engine knock, the fuel consumption, thermal efficiency, or other performance metrics of the engine 3. The performance metric chosen during the operation of the engine 3 may vary according to the operating temperature, engine load, or other operating conditions of the engine 3.

Following the formation of the reformer feed mixture, the reformer feed mixture is passed from the second exhaust line 19 into the catalytic reformer 29, where the reformer feed mixture is reacted to create a reformate exhaust stream. The reforming process may include a steam reforming process, a partial oxidation reforming process, a dry reforming process, a water-gas shift reaction process, or a combination thereof.

These processes are summarized in Table 2, below, which shows the various chemical pathways in which the reformate feed mixture is reacted to create the reformate exhaust stream. Table 2 also shows the enthalpy of the reaction, assuming a complete reaction of fuel, air, and exhaust gases. The fuel injected by the second fuel injector 27 may be a motor gasoline, for example, which may contain various straight chain, branched, and aromatic hydrocarbons, such as isooctane and toluene, as well as alcohols or ethers, such as propanol, butanols, methanol, ethanol, methyl tert butyl ether, ethyl tert butyl ether, tert amyl methyl ether, among others. In addition, in order to catalyze the reformation reaction, the catalytic reformer 29 may contain a reforming catalyst, such as one including precious metals such as platinum, palladium, rhodium, or any combination thereof. To this end, a core of the catalytic reformer 29 may include a monolith with small channels or a packed bed with pellets to provide a surface area for gaseous constituents to interact with the catalyst.

TABLE 2

Chemical Pathways of the Reformation Reaction

| | Chemical Pathway | Reaction Enthalpy ($\Delta H$) Direction |
|---|---|---|
| 1. | $C_xH_yO_z + \frac{x-z}{2}O_2 \rightarrow xCO + \frac{y}{2}H_2$ | ($\Delta H < 0$) |

TABLE 2-continued

Chemical Pathways of the Reformation Reaction

| | Chemical Pathway | Reaction Enthalpy ($\Delta H$) Direction |
|---|---|---|
| 2. | $C_xH_yO_z + (x-z)H_2O \rightarrow xCO + \left(\frac{y}{2} + x - z\right)H_2$ | ($\Delta H > 0$) |
| 3. | $C_xH_yO_Z + (2x-z)H_2O \rightarrow xCO_2 + \left(\frac{y}{2} + 2x - z\right)H_2$ | ($\Delta H > 0$) |
| 4. | $C_xH_yO_z + \left(x + \frac{y}{4} - \frac{z}{2}\right)O_2 \rightarrow xCO_2 + \frac{y}{2}H_2O$ | ($\Delta H < 0$) |
| 5. | $C_xH_yO_Z + (x-z)CO_2 \rightarrow (2x-z)CO + \frac{y}{2}H_2$ | ($\Delta H > 0$) |
| 6. | $CO + H_2O \rightarrow CO_2 + H_2$ | ($\Delta H < 0$) |

As seen in Table 2, the additional fuel and air injected into the exhaust stream combines with the oxygen (O), carbon dioxide ($CO_2$), or water ($H_2O$) during the reformation reaction to form $H_2$ and CO. The $H_2$ and CO molecules may then be used during a subsequent combustion process of the combustible mixture. Advantageously, this reduces engine knock and $NO_x$ production due to the increased flame speed and knock tolerance of the $H_2$ and CO in the combustible mixture.

Continuing with Table 2, because reaction 1, above, proceeds more rapidly than the other pathways, it is desirable to operate the reformer in a fuel rich and oxygen poor environment such that the ratio of oxygen atoms to fuel carbon atoms is less than one. Reaction pathway 1 generates both reformate as well as heat, increasing the rate of other reactions which act on any remaining fuel molecules. The heat generated from reaction pathway 1 may be recycled via endothermic reaction pathways 2, 3 and 5, which take the exhaust enthalpy generated in reaction pathway 1 and convert it back into chemical potential energy.

Because the reactions may be endothermic, a portion of the reformate feed mixture may be separated upstream of the catalytic reformer 29, and the heat from the separated portion may be provided to the catalytic reformer 29 through a vent line (not shown) that runs in or around the catalytic reformer 29. In such cases, the vent line (not shown) provides a physical barrier such that the separated portion of the reformate feed mixture cannot be mixed with the reformate feed mixture inside of the catalytic reformer 29. The heat from the separated portion of the reformate feed mixture permeates the physical barrier of the vent line, thus providing heat for the endothermic reactions (i.e., reaction pathways 1, 2, 3, and 5).

Following the reformation reaction, the reformate exhaust stream is then passed from the catalytic reformer 29 to a reformer effluent line 21 that is configured to connect the catalytic reformer 29 to the turbocharger inlet line 37. As seen in FIG. 1 and further described below, the reformer effluent line 21 may be coupled with a plurality of devices configured to control the temperature, pressure, and flow rate of the reformate exhaust stream before the reformate exhaust stream is delivered to the turbocharger inlet line 37. Specifically, the reformer effluent line 21 depicted in FIG. 1 has a reformate valve 31 and a reformate cooling device 33 which may act upon the reformate exhaust stream to cool and control the flow of reformate-containing EGR into the engine 3.

The reformate valve 31 may be coupled to the reformer effluent line 21 downstream of the catalytic reformer 29 such that the reformate valve 31 is configured to control an amount of the reformate exhaust stream that enters the reformate cooling device 33 and catalytic reformer 29. In FIG. 1, the reformate valve 31 is embodied as a solenoid valve, however the reformate valve 31 may be embodied as a poppet valve, butterfly valve, vacuum valve, or ball valve that is controlled by the ECU (not shown) of the engine 3 according to the operating conditions of the engine 3. Alternatively, or additionally, the reformate valve 31 may be embodied as or include a check valve to prevent the reformate exhaust stream from reentering the catalytic reformer 29.

The reformate cooling device 33 may be coupled to the reformer effluent line 21 downstream of the reformate valve 31 such that the reformate cooling device 33 is configured to reduce a temperature of the reformate exhaust stream that is delivered from the catalytic reformer 29. However, in the embodiment depicted in FIG. 1, the turbocharger 35 has already used some of the heat from the exhaust stream which advantageously allows the reformate cooling device 33 to do less work cooling the reformate exhaust stream. To cool the reformate exhaust stream, the reformate cooling device 33 may consist of a plate and frame style heat exchanger made from steel, aluminum, or plastic, where engine coolant is circulated through the reformate cooling device 33 to reduce the temperature of the reformate exhaust stream.

Following the cooling of the reformate exhaust stream in the reformate cooling device 33, the reformate exhaust stream from the catalytic reformer 29 is mixed with air in a turbocharger inlet line 37 prior to entering the turbocharger 35. Specifically, the turbine 36 of the turbocharger 35 is coupled to the first exhaust line 17 of an engine 3 and a turbocharger inlet line 37 is coupled to a reformer effluent line 21 that connects to the catalytic reformer 29.

Due to the introduction of the reformate exhaust stream to the turbocharger inlet line 37 upstream of the turbocharger 35, the turbocharger 35 will compress both the air in the turbocharger inlet line 37 and the reformate exhaust stream. This compression of the reformate exhaust stream with the air stream in the turbocharger inlet line 37 creates a pressurized reformate exhaust stream. The pressurized reformate exhaust stream may be fed into the combustion chamber 13 through the throttle 7 and air intake manifold 9, where the mixed air stream is further mixed with fuel from the first fuel injector 11 to form a new combustible mixture.

Optionally, the reformate exhaust stream may be compressed by a boost device 41 coupled in the reformer effluent line 21 prior to entering the air-cooling device 5. Specifically, the boost device 41 may be configured to compress the reformate exhaust stream prior to entering the air-cooling device 5 such that sufficient torque is maintained due to the increased airflow. In addition, because the reformate exhaust stream mixes with the air stream after the first portion of air has been compressed by the turbocharger 35, the boost device 41 restores pressure lost from mixing the compressed air with the low-pressure reformate exhaust stream. The boost device 41 may be embodied as a second turbocharger or a supercharger, and may be formed of aluminum, steel, or an aluminum alloy.

Figure 2:
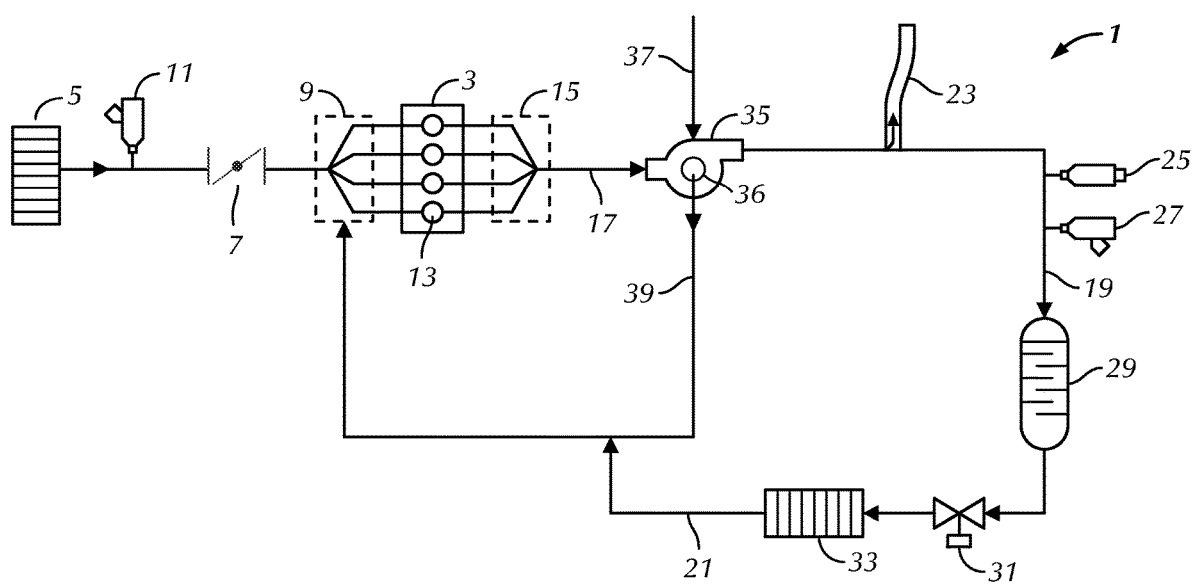
FIG. 2 illustrates a flow diagram in accordance with one or more embodiments.

FIG. 2 shows an alternate embodiment of the fuel reforming system 1 and engine 3 of FIG. 1 in which the turbine 36 of the turbocharger 35 is coupled to the first exhaust line 17 and the turbocharger outlet line 39 is coupled to the reformer effluent line 21. This arrangement allows the turbocharger 35 to be upstream of the air injector 25 and the second fuel injector 27, while the reformate exhaust stream may be mixed with pressurized air from the turbocharger outlet line 39.

This mixing of the reformate exhaust stream with the compressed air stream from the turbocharger 35 creates a pressurized reformate exhaust stream. The pressurized reformate exhaust stream may be fed into the combustion chamber 13 through the throttle 7 and air intake manifold 9, where the mixed air stream is further mixed with fuel from the first fuel injector 11 to form a new combustible mixture.

Optionally, the reformate exhaust stream may be compressed using an EGR pump (not shown) disposed in the reformer effluent line 21 to increase the EGR flow rate under high load conditions. Specifically, by implementing an EGR pump (not shown) exhaust gases may flow during high engine load conditions where high intake pressure would normally prohibit EGR flow. The EGR pump (not shown) may be embodied as a mechanically, electrically, or hydraulically driven compressor, and may be formed of aluminum, steel, or an aluminum alloy. To this end, a turbine (not shown) of the EGR pump may be electrically actuated by an electrical system of the engine 3 or mechanically actuated by exhaust gases from the primary exhaust stream.

Figure 3:
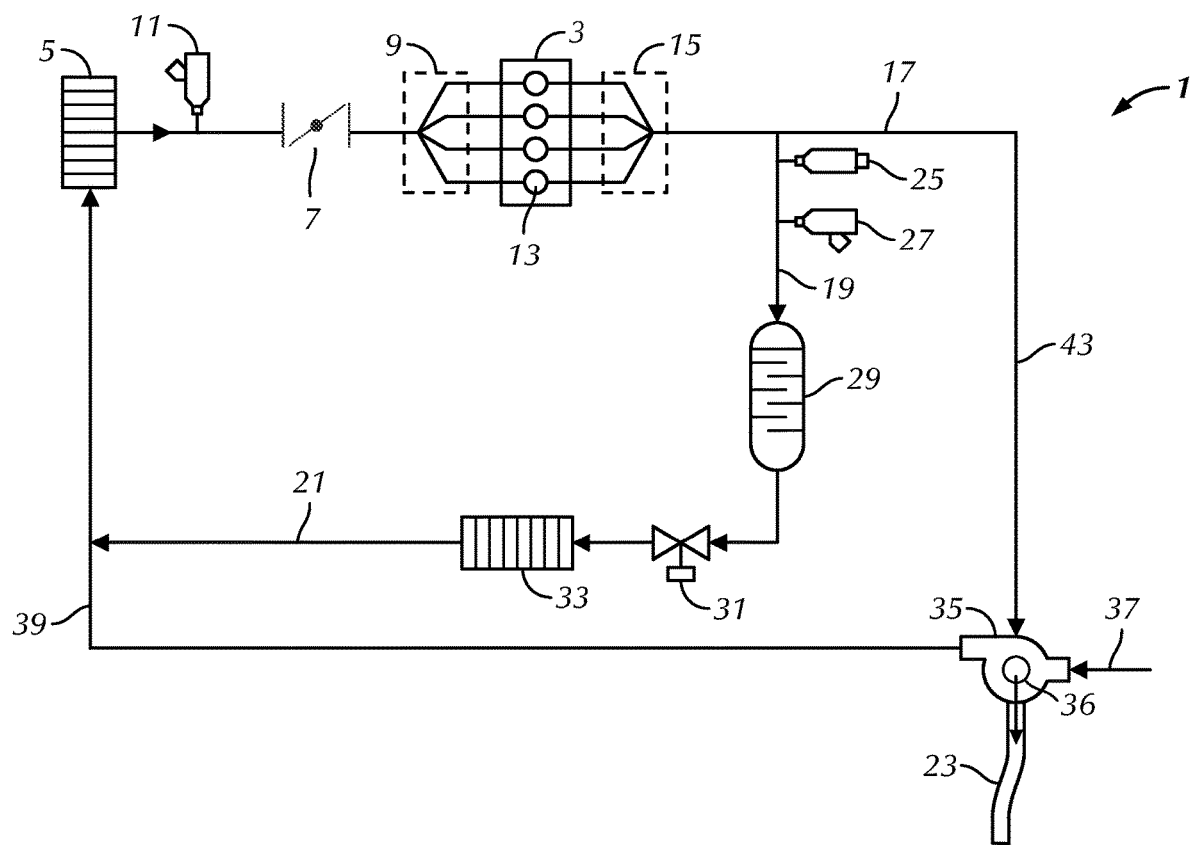
FIG. 3 illustrates a flow diagram in accordance with one or more embodiments.

In the case of the embodiments shown in FIG. 1 and FIG. 2, the turbine 36 of the turbocharger 35 is connected to the first exhaust line 17 upstream of the second exhaust line 19. However, FIG. 3 depicts an embodiment of the fuel reforming system 1 and engine 3 in which a third exhaust line 43 branches from a first exhaust line 17 of an engine 3 to connect to a turbine 36 of a turbocharger 35 such that the turbocharger 35 is arranged in parallel with the air injector 25 and second fuel injector 27.

In this embodiment, a second exhaust line 19 branches from the first exhaust line 17 upstream of the third exhaust line 43. This allows a secondary exhaust stream to be separated from a primary exhaust stream in the second exhaust line 19 prior to the primary exhaust stream entering the turbine 36 of the turbocharger 35. Consequently, the secondary exhaust stream has a higher pressure and temperature than the primary exhaust stream after the primary exhaust stream has actuated the turbine 36 of the turbocharger 35, which results in higher temperature EGR entering the reformer and thus an increased conversion of fuel in the reformer. The higher pressure of the secondary exhaust stream also allows for greater flow rate of exhaust gas recirculation, resulting in a decrease in the system response time.

Figure 4:
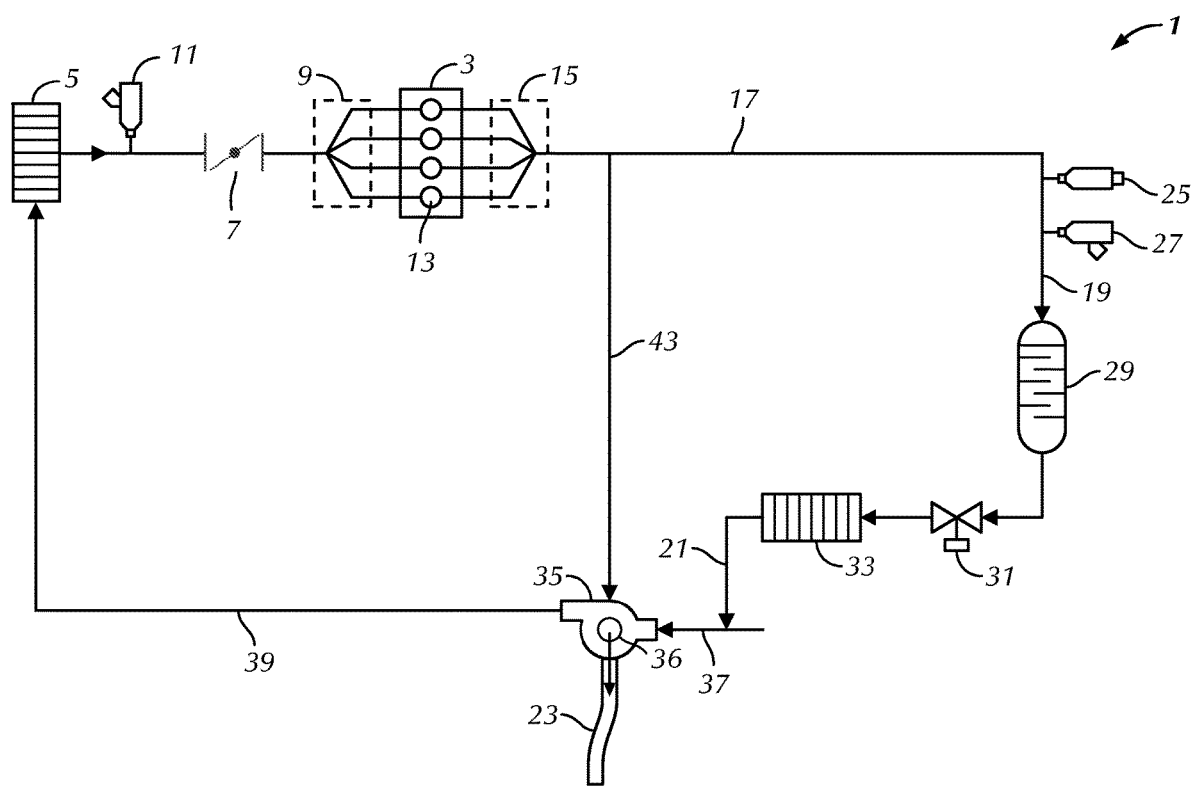
FIG. 4 illustrates a flow diagram in accordance with one or more embodiments.

FIG. 4 depicts a fuel reforming system 1 and engine 3 in accordance with one or more embodiments of the invention. Specifically, FIG. 4 depicts a fuel reforming system 1 in which a second exhaust line 19 branches from a first exhaust line 17 of the engine 3 without a primary exhaust stream first entering a turbocharger 35. In this embodiment, a portion of a primary exhaust stream of the first exhaust line 17 can enter either the second exhaust line 19, and thus a catalytic reformer 29, or a third exhaust line 43 that connects to a turbine 36 of the turbocharger 35 and a tailpipe 23, depending on the operating conditions of the engine and the position of the reformate valve 31. In addition, a reformer effluent line 21 may connect the catalytic reformer 29 to a turbocharger inlet line 37 such that a reformate exhaust stream from the catalytic reformer 29 can freely mix with a third portion of air that enters the turbocharger inlet line 37.

In this embodiment, the high-pressure exhaust gases in the secondary exhaust stream are mixed with the low-pressure air in the turbocharger inlet line 37 prior to entering the turbocharger 35. This advantageously provides a significant pressure driving force for flowing EGR, allowing for maximum responsiveness and maximum flow without additional pumping devices to move the EGR.

Figure 5:
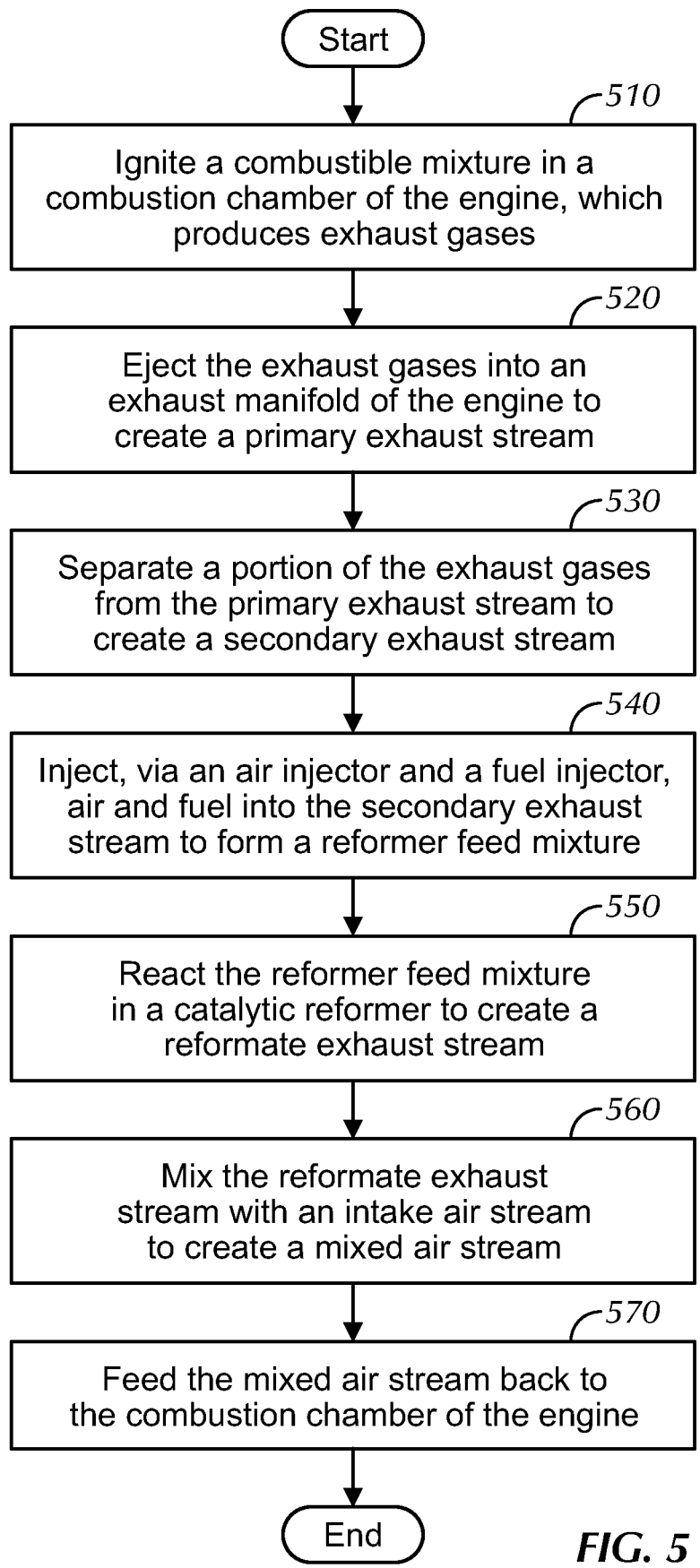
FIG. 5 illustrates a flowchart in accordance with one or more embodiments.

FIG. 5 depicts a flowchart of a method of operating an engine in accordance with one or more embodiments. In some embodiments, the method may be implemented by using a fuel reforming system 1 and engine 3 as described in FIGS. 1-4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In block 510, a combustible mixture is ignited in a combustion chamber 13 of the engine 3. The combustible mixture may be drawn through the air intake manifold 9 into the combustion chamber 13 and may pass through an air-cooling device 5 and throttle 7. The combustible mixture may be formed from fuel mixed with an engine intake stream and may include recirculated exhaust gases from previous combustion processes. The ignition of the combustible mixture may produce exhaust gases from a combustion reaction of the combustible mixture.

In block 520, the exhaust gases created in block 510 may be ejected from the combustion chamber 13 into an exhaust manifold 15 of the engine 3 to create a primary exhaust stream. Specifically, the exhaust gases may be forced from the combustion chamber 13 by an actuation of a piston (not shown) of the combustion chamber 13, which forces the exhaust gases into the exhaust manifold 15. The exhaust manifold 15 then collects the exhaust gases to create a primary exhaust stream, which may be passed through a first exhaust line 17 that connects the engine 3 to a tailpipe 23.

In block 530, a portion of the exhaust gases may be separated from the primary exhaust stream to create a secondary exhaust stream. The separation may occur at the junction between the first exhaust line 17 to a catalytic reformer 29. In addition, the separation may alternatively be facilitated by a three-way valve, coupled at the junction between the first exhaust line 17 and the second exhaust line 19. The three-way valve may be controlled by the ECU (not shown) and configured to selectively allow a separation of the secondary exhaust stream from the primary exhaust stream. The second exhaust line 19 may also have an air injector 25 and a second fuel injector 27 coupled upstream of the catalytic reformer 29 that are configured to inject air and fuel into the secondary exhaust stream.

Optionally, the first exhaust line 17 may be configured to connect to a turbine 36 of a turbocharger 35 prior to connecting to the second exhaust line 19. In this case, the primary exhaust stream is passed through a turbocharger 35 prior to separating the portion of the exhaust gases from the primary exhaust stream in order to draw air into the turbocharger 35 and creating a compressed air stream. Alternatively, the turbine 36 of the turbocharger 35 may be configured to connect to the first exhaust line 17 after the second exhaust line 19 branches from the first exhaust line 17 such that the primary exhaust stream passes through a turbocharger 35 after separating the portion of the exhaust gases from the primary exhaust stream.

In block 540, fuel and air are mixed into the secondary exhaust stream through the second fuel injector 27 and the air injector 25 to form a reformer feed mixture. The amount of fuel and air that is injected through the second fuel injector 27 and the air injector 25 may depend upon the engine speed and torque, the EGR rate, indicators of the ambient environmental conditions, or other engine operating conditions, performance metrics, or combinations thereof. Environmental conditions may further include the ambient air temperature, the engine coolant or oil temperature, or the runtime of the engine 3.

In block 550, the reformer feed mixture formed previously may be reacted in a catalytic reformer 29 to create a reformate exhaust stream. The reformation process may include steam reforming, partial oxidation reforming, dry reforming, or a combination thereof. In order to catalyze the reformation reaction, the catalytic reformer 29 may have a core formed of precious metals such as platinum, palladium, rhodium, or any combination thereof. The core may include a monolith with small channels or a packed bed with pellets to provide surface area for gaseous constituents to interact with the catalyst.

In block 560, the reformate exhaust stream may be fed back into the intake air stream to create a mixed air stream. Due to the reformation process, this mixed air stream will have a higher $H_2$ and CO content than the intake air stream. The mixed air stream may be formed in an air-cooling device 5 such as an intercooler or charge air cooler, where the mixed air stream is then cooled by the surrounding engine coolant or ambient air in the air-cooling device 5. Alternatively, the mixed air stream may be created in a turbocharger outlet line 39 or a turbocharger inlet line 37, depending upon the configuration of the turbocharger 35. In addition, the mixed air stream may be created by a dedicated mixing device or by a tee-junction that allows the reformate exhaust stream to freely mix with the intake air stream.

In block 570, the mixed air stream is fed back to the combustion chamber 13 of the engine 3. The mixed air stream may be mixed with fuel from a first fuel injector 11 inside of the combustion chamber 13 to create a new combustible mixture, or the first fuel injector 11 may be mounted in at an intake port (not shown) of the combustion chamber 13 to inject fuel into the engine intake stream as the intake stream enters the engine 3. In either embodiment, the new combustible mixture may be ignited in the combustion chamber 13, and the process may restart.

Accordingly, the aforementioned embodiments of the invention as disclosed relate to devices, systems, and methods for improving engine efficiency. The desire to avoid engine auto-ignition or "knock" drives the use of lower compression ratios and late combustion phasing, which reduces efficiency. Although dilution tolerance and knock tolerance are a function of many engine parameters, both can be improved by the addition of hydrogen and carbon monoxide (alone or in combination) to the charge mixture.

Therefore, the devices, systems, and methods disclosed above address the challenges of preventing knock and improving engine efficiency by increasing the $H_2$ and CO content of the combustion reaction. As described above, $H_2$ and CO have higher resistance to auto ignition than gasoline, and, therefore, the increased $H_2$ and CO levels may improve the knock tolerance of the engine. In addition, the increased levels of $H_2$ and CO also aid in the combustion process by increasing the flame speed of the fuel mixture and shortening the combustion duration. The faster burn allows additional EGR to be introduced into the engine, further reducing knock while also reducing heat loss, NOx emissions, and throttling losses. The improved knock tolerance of the engine, the use of higher compression ratios, and better combustion phasing, in turn, each contribute to improving the efficiency of the engine.

Injecting air into the secondary exhaust stream has the added benefit of periodically removing built up formations of coke in the catalytic reformer. Specifically, the injected air increases the oxygen content of the secondary exhaust stream prior to entering the catalytic reformer. This increased oxygen content may then facilitate the oxidation of the coke deposits, which aids in the periodic restoration of the catalytic reformer without performing additional maintenance.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. A method of operating an engine, the method comprising:
   igniting a first combustible mixture in a combustion chamber of the engine, thereby producing exhaust gases;
   ejecting the exhaust gases into an exhaust manifold of the engine to create a primary exhaust stream;
   separating a portion of the exhaust gases from the primary exhaust stream to create a secondary exhaust stream;
   passing the primary exhaust stream through a turbocharger after separating the portion of the exhaust gases from the primary exhaust stream;
   drawing a first portion of air into the turbocharger and compressing the first portion of air to create a compressed air stream;
   mixing a second portion of air and a first portion of fuel with the secondary exhaust stream to form a reformer feed mixture;
   reacting the reformer feed mixture in a catalytic reformer to create a reformate exhaust stream;
   mixing the reformate exhaust stream with the compressed air stream to create a mixed air stream;
   injecting a second portion of fuel into the mixed air stream to form a second combustible mixture;
   controlling, with a throttle, an amount of the second combustible mixture to be fed into the combustion chamber of the engine; and
   feeding the second combustible mixture to the combustion chamber,
   wherein the second portion of fuel is injected with a fuel injector disposed upstream of the throttle and an air intake manifold of the engine.

2. The method of claim 1, wherein reacting the reformate exhaust stream in the catalytic reformer comprises passing the reformate exhaust stream over a catalyst comprising platinum, palladium, rhodium, or a combination thereof.

3. The method of claim 1, wherein mixing the second portion of air and the fuel into the secondary exhaust stream comprises sequentially mixing the second portion of air and the fuel into the secondary exhaust stream.

4. The method of claim 1, wherein mixing the second portion of air and the fuel with the secondary exhaust stream comprises simultaneously injecting the second portion of air and the fuel into the secondary exhaust stream.

5. The method of claim 1, further comprising: determining an engine speed, torque, exhaust flow rate to the catalytic reformer, or indicators of environmental conditions, wherein an amount of air and fuel mixed into the secondary exhaust stream is determined according to the determined engine speed, torque, exhaust flow rate to the catalytic reformer, or the indicators of the environmental conditions.

6. The method of claim 1, further comprising cooling the reformate exhaust stream subsequent to mixing the reformate exhaust stream with the compressed air stream.

7. The method of claim 1, wherein mixing the second portion of air with the secondary exhaust stream comprises injecting the second portion of air into the secondary exhaust stream through a venturi mixer, sparger, or nozzle.

8. The method of claim 1, wherein reacting the reformer feed mixture in the catalytic reformer comprises a steam reforming process, a partial oxidation reforming process, a dry reforming process, a water-gas shift process, or a combination thereof.

9. A system comprising:
an engine comprising:
a combustion chamber configured to ignite a first combustible mixture, thereby producing exhaust gases;
an air intake manifold configured to feed a first portion of air into the combustion chamber;
a first fuel injector configured to inject a first portion of fuel into an engine intake air stream;
an exhaust manifold configured to receive combustion products from the combustion chamber thereby forming a primary exhaust stream;
a first exhaust line configured to connect the exhaust manifold to a tailpipe;
a second exhaust line, branching from the first exhaust line, configured to provide a portion of the combustion products to a catalytic reformer;
an air injector configured to inject a second portion of air into the second exhaust line thereby forming a reformer feed mixture;
a second fuel injector configured to inject a second portion of fuel into the second exhaust line;
a reformer effluent line configured to connect the catalytic reformer to the air intake manifold;
a throttle configured to control an amount of the first combustible mixture to be fed into the combustion chamber of the engine;
a turbocharger configured to compress the first portion of air to form a compressed air stream;
a turbocharger inlet line configured to deliver the first portion of air into the turbocharger; and
a turbocharger outlet line configured to connect the turbocharger to the air intake manifold and the throttle,
wherein the turbocharger is coupled to the first exhaust line in parallel with the air injector and the second fuel injector, and the turbocharger outlet line is coupled to the reformer effluent line upstream of the throttle such that a reformate exhaust stream formed by processing the reformer feed mixture through the catalytic reformer is mixed with the compressed air stream at a junction of the reformer effluent line and the turbocharger outlet line to create a mixed air stream, and
wherein the first fuel injector is disposed upstream of the throttle and the air intake manifold and is configured to inject a third portion of fuel into the mixed air stream to form a second combustible mixture to be controlled by the throttle and fed into the combustion chamber.

10. The system of claim 9, further comprising a reformate cooling device configured to reduce a temperature of a reformate exhaust stream that it delivered from the catalytic reformer, wherein the reformate cooling device is coupled to the reformer effluent line downstream of the catalytic reformer.

11. The system of claim 9, further comprising a reformate valve, coupled to the reformer effluent line, that is configured to control an amount of a reformate exhaust stream that enters the engine.

12. The system of claim 9, wherein the air injector comprises a venturi mixer, sparger, or nozzle.

13. The system of claim 9, further comprising a boost device configured to compress a reformate exhaust stream.

* * * * *